United States Patent [19]
Wampler

[11] Patent Number: 5,796,619
[45] Date of Patent: Aug. 18, 1998

[54] METHOD AND APPARATUS FOR NUMERICALLY CONTROLLED PROBING

[75] Inventor: Robert R. Wampler, Augusta, Kans.

[73] Assignee: The Boeing Company, Seattle, Wash.

[21] Appl. No.: 602,257

[22] Filed: Feb. 15, 1996

[51] Int. Cl.$^6$ .................................................. G06F 19/00
[52] U.S. Cl. .............................. 364/474.37; 364/474.36
[58] Field of Search .................. 364/474.37, 571.05, 364/559, 551.01, 552, 474.02, 474.29, 474.35, 474.36; 318/568, 572, 569; 33/559; 235/151.11

[56] References Cited

U.S. PATENT DOCUMENTS

| | | | |
|---|---|---|---|
| 3,633,011 | 1/1972 | Bederman et al. | 235/151.11 |
| 4,382,215 | 5/1983 | Barlow et al. | 318/568 |
| 4,554,495 | 11/1985 | Davis | 318/572 |
| 4,562,392 | 12/1985 | Davis et al. | 318/572 |
| 4,875,177 | 10/1989 | Jarman | 364/559 |
| 4,901,253 | 2/1990 | Iwano et al. | 364/522 |
| 4,918,627 | 4/1990 | Garcia et al. | 364/552 |
| 4,945,501 | 7/1990 | Bell et al. | 364/571.05 |
| 5,109,610 | 5/1992 | Johnson | 33/559 |
| 5,165,051 | 11/1992 | Kumar | 324/79 |
| 5,357,450 | 10/1994 | Hemmerie et al. | 364/551.01 |
| 5,477,118 | 12/1995 | Yoneda et al. | 318/569 |

OTHER PUBLICATIONS

Udell, "Macintosh CAD . . . Age", Byte, 187–190, May 1990.

McCelland, "Integrated . . . software", MacWorld, 159–160, Nov. 1992.

Goggin, "Digital . . . Translator", News Release, Sep. 13, 1988.

"Adra . . . CADRA III", News Release, Oct. 1993.

*Primary Examiner*—Paul P. Gordon
*Attorney, Agent, or Firm*—Lawrence W. Nelson

[57] ABSTRACT

A probing system used for determining a measured set of dimensions of at least one feature of an object. The system comprises an input device that receives an ideal set of dimension of the at least one feature. The input device generates a first signal indicative of an amount and location of sample measurements taken of the at least one feature. The system also comprises a probe device, which is electrically connected to the input device. The probe device receives the first signal from the input device, and in response directs a probe to the location of the measurements to be taken for each of the amount of sample measurements indicated. The probe device outputs a second signal indicative of a measured location for each of the amount of samples taken. The system further comprises a processor electrically connected to the probe device. The processor receives the second signal indicative of the measured locations of each of the samples taken, and rotates the measured locations about a single sample so all samples can be represented as a point lying on a two dimensional plane. Further, the processor uses the rotated samples to calculate a set of rotated dimensions, and then counter-rotates the rotated dimensions back to the positions of the measured locations to determine the measured set of dimensions of the feature.

16 Claims, 16 Drawing Sheets

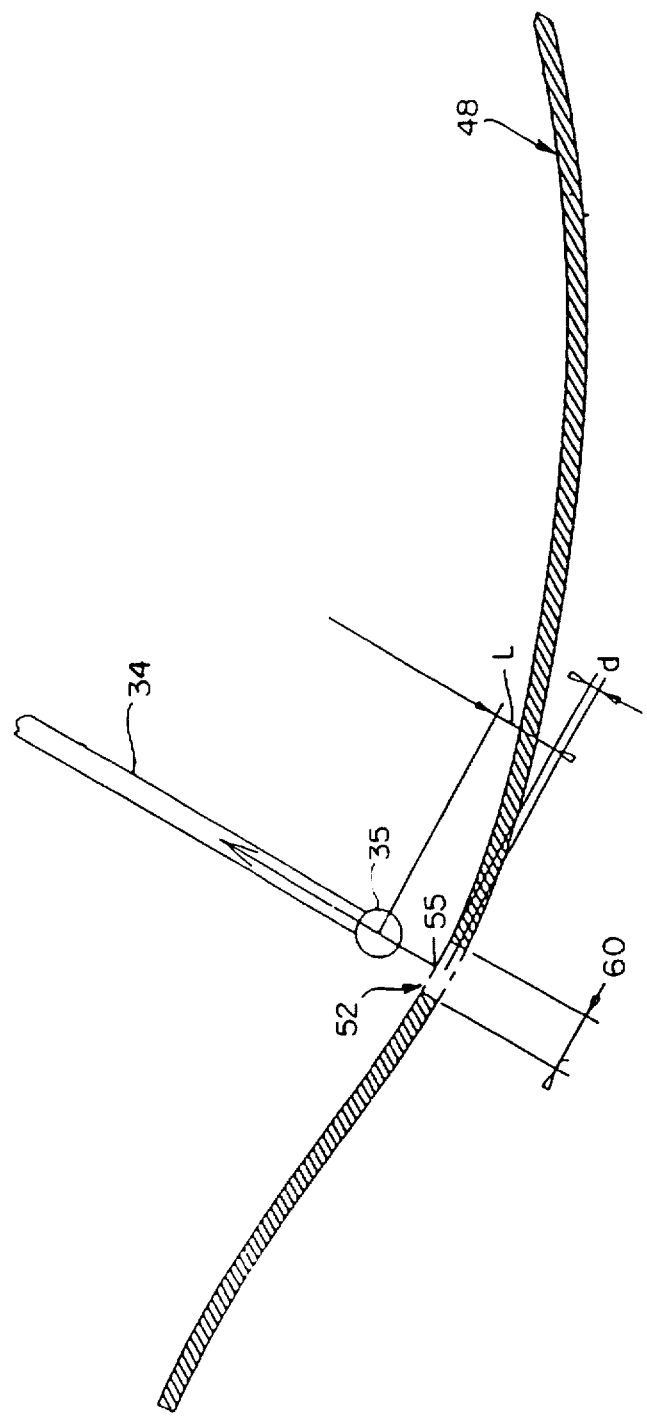

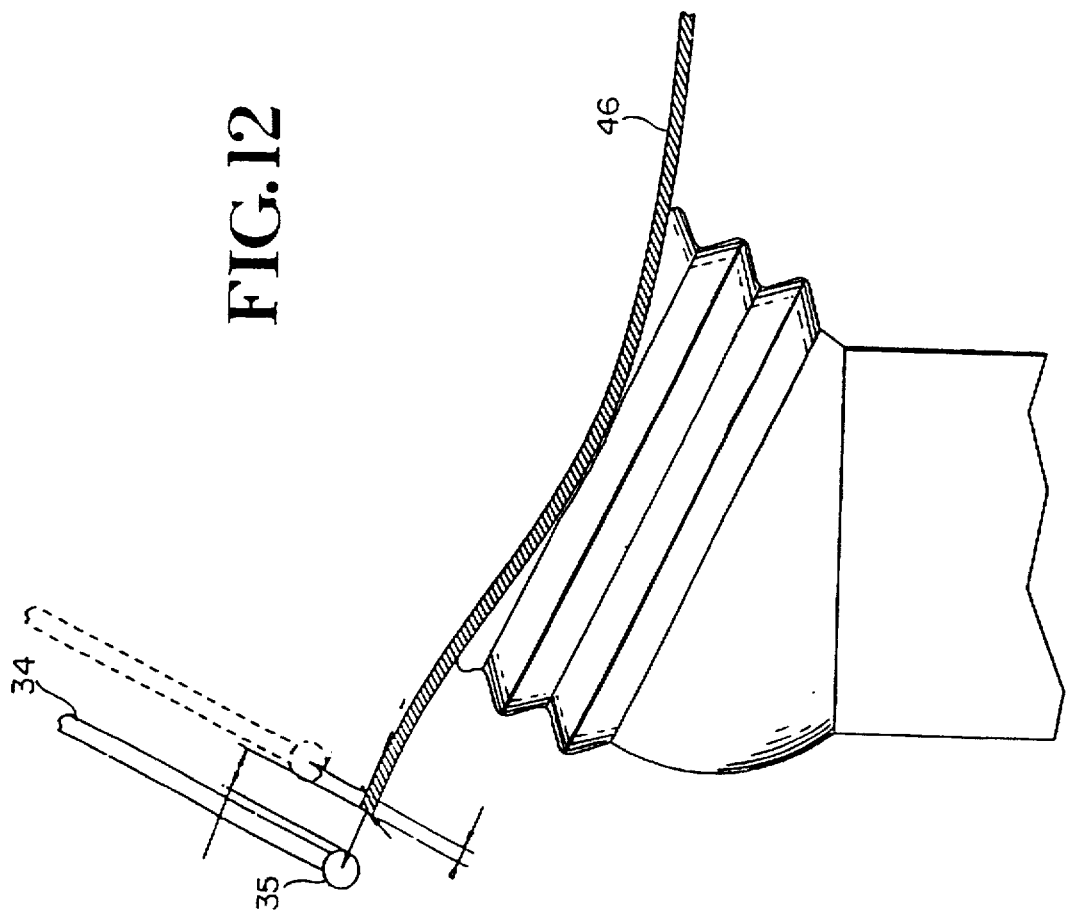

METHOD AND APPARATUS FOR NUMERICALLY CONTROLLED PROBING

BACKGROUND OF THE INVENTION

1. Field of the Invention

The present invention relates to a method and apparatus for probing a component using a numerically controlled device, and, more particularly to a method and apparatus for probing a component along multiple axes using a numerically controlled device.

2. Background Information

The present invention relates to a Numerically Controlled (NC) device. As shown in FIGS. 1a and 1b, an NC device 400 often includes a platform 402 which uses support devices, shown here as stand-offs 404a–c, to hold a component 406 in a fixed position. The NC device 400 also has a chuck 408 attached to an articulating head 410 capable of pivoting about a b axis, as shown in FIG. 1a, as well as an a and c axis, as shown in FIG. 1b. The NC device 400 moves the chuck 408 along the X and Y-axis utilizing the movement of an arm 412 that travels along tracks (not shown). The arm 412 is also capable of moving the position of the chuck 408 along the Z-axis using a vertical track 414, shown in FIG. 1b. The chuck 408 is capable of holding a drill, a milling tool, as well as a number of other tools typically used in precision machining.

As shown in the block diagram of FIG. 2, the NC device 400 includes an input device 416 for inputting "high level" instructions designating the precise locations of features on the component 406 where a machining operation is to take place. These instructions are transmitted to a post processor 418. The post processor 418 is in communication with a machine control unit (MCU) 422 of the NC device 400. The post processor 418 adapts the "high level" instructions from the input device 416 to the specific requirements of the particular NC device 400 and its MCU 422, and outputs a work piece instruction understandable to the MCU 422. The instructions from the post processor 418 are stored in a memory 420. The memory 420 can either be located on the NC device 400, as is the case when the NC device 400 is a computer numerical control (CNC) device having its own dedicated individual computer, or the memory 420 can be located remote from the NC device 400, as is the case when the NC device is a direct numerical control (DNC) device. In the case where the NC device 400 is a DNC device, a remote computer such as a mainframe or UNIX workstation will hold the instructions from the post processor in memory until accessed by the MCU 422.

To operate the arm 412 and the articulating head 410 of the NC device 400, the MCU 422 sequentially accesses work piece instructions from the memory 420 and then translates these instructions into signals directly actionable by the numerically controlled device 400. For example, if the instruction is to move the chuck 408 to a position some number of units along the X direction, then the MCU 422 will apply a voltage to at least one of motors 424a–424e to drive the arm 412 along the track (not shown) on the platform 402, until it has moved the designated number of units. In an open loop system, a known amount of travel will be performed by the motors 424a–424e, preferably stepping motors, when a given voltage for a given duration is applied to the motors 424a–424e. On the other hand, in a closed loop system, the MCU 422 will apply the signal voltage until a sensing device (not shown) determines that the arm 412 has traveled the designated number of units. Thus, in a closed loop system, the articulating head 410 moves in response to instruction from the MCU 422 and then the sensing device indicates to the controller 422 when it has reached the desired position.

Once the NC device 400 has completed its operations upon the component 406, the accuracy of the operations must be checked to ensure that the final dimensions of the component 406 are within acceptable tolerances.

One method of ensuring that the component 406 is within tolerance is to remove it from the stand-offs 404a–404c and transfer it to a coordinate measurement machine (CMM) (not shown). However, when the component 406 is very large, such a transfer becomes exceedingly difficult and may cause the component to permanently distort by warping or drooping. Further, CMM's tend to be expensive, so there are usually only a few available. This causes long queues and delays before the component 406 can be checked. For the foregoing reason, there is a need to develop a method that can determine if the component 406 is within tolerance by the generation, transmission and analysis of digital data from the MCU 422 of the NC device 400 utilizing probe technology.

The probe technology should be capable of performing multi-axis probing, probe qualification, and the determination of hole location and diameter. The probe technology should also be capable of measuring the contour and periphery of the component 406. The probe technology should accomplish the above objectives by utilizing a plurality of data points to determine if the component 406 is acceptable.

Prior attempts to use an MCU 422 to perform the complex calculations required during an inspection took a prohibitively long period of time. Further, these attempts were only capable of measuring along three axes. They were incapable of measuring off-line multi-axes, such as components machined by the 5-axis articulating head 410. For the foregoing reasons, there is a need to perform high speed (5-axis) inspection probing using the NC device 400.

SUMMARY OF THE INVENTION

In accordance with the invention, a probing system is used for determining a measured set of dimensions of at least one feature of an object. The system comprises an input device that receives an ideal set of dimensions of the at least one feature. The input device generates a first signal indicative of an amount and location of sample measurements taken of the at least one feature. The system also comprises a probe device, which is electrically connected to the input device, and includes a probe. The probe device receives the first signal from the input device, and in response directs the probe to the location of the measurements to be taken for each of the amount of sample measurements indicated. The probe device outputs a second signal indicative of a measured location for each of the amount of samples taken. The system further comprises a processor electrically connected to the probe device. The processor receives the second signal indicative of the measured locations of each of the samples taken, and rotates the measured locations about a single sample so all samples can be represented as a point lying on a two dimensional plane. Further, the processor uses the rotated samples to calculate a set of rotated dimensions, and then counter-rotates the rotated dimensions back to the positions of the measured locations to determine the measured set of dimensions of the feature.

BRIEF DESCRIPTION OF THE DRAWING(S)

FIG. 1a is a side view of a conventional Numerically Controlled (NC) device;

3

FIG. 6 is a side view of the probe being used to inspect a hole in a component;

Figure 10A:
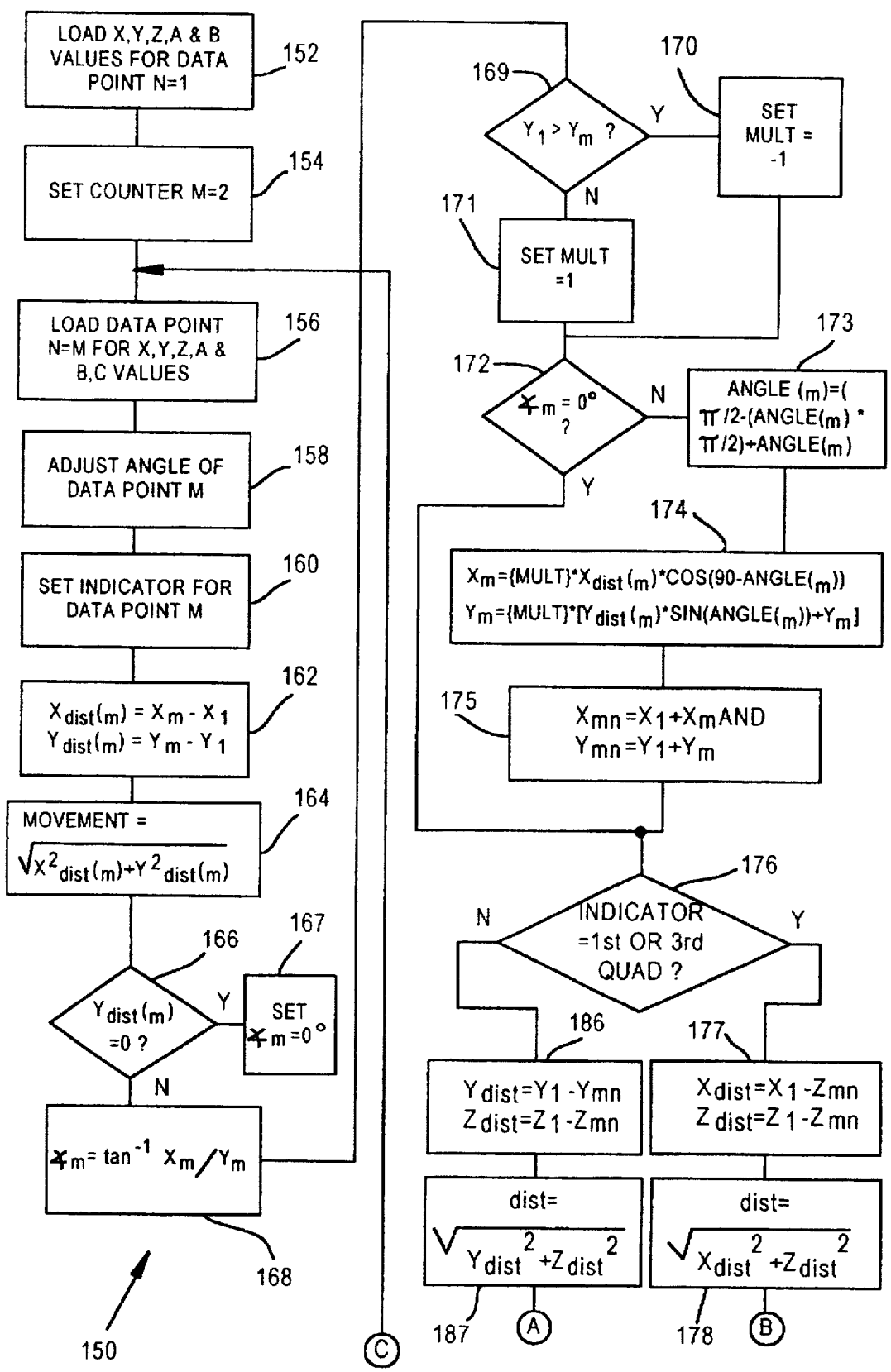
Figure 10B:
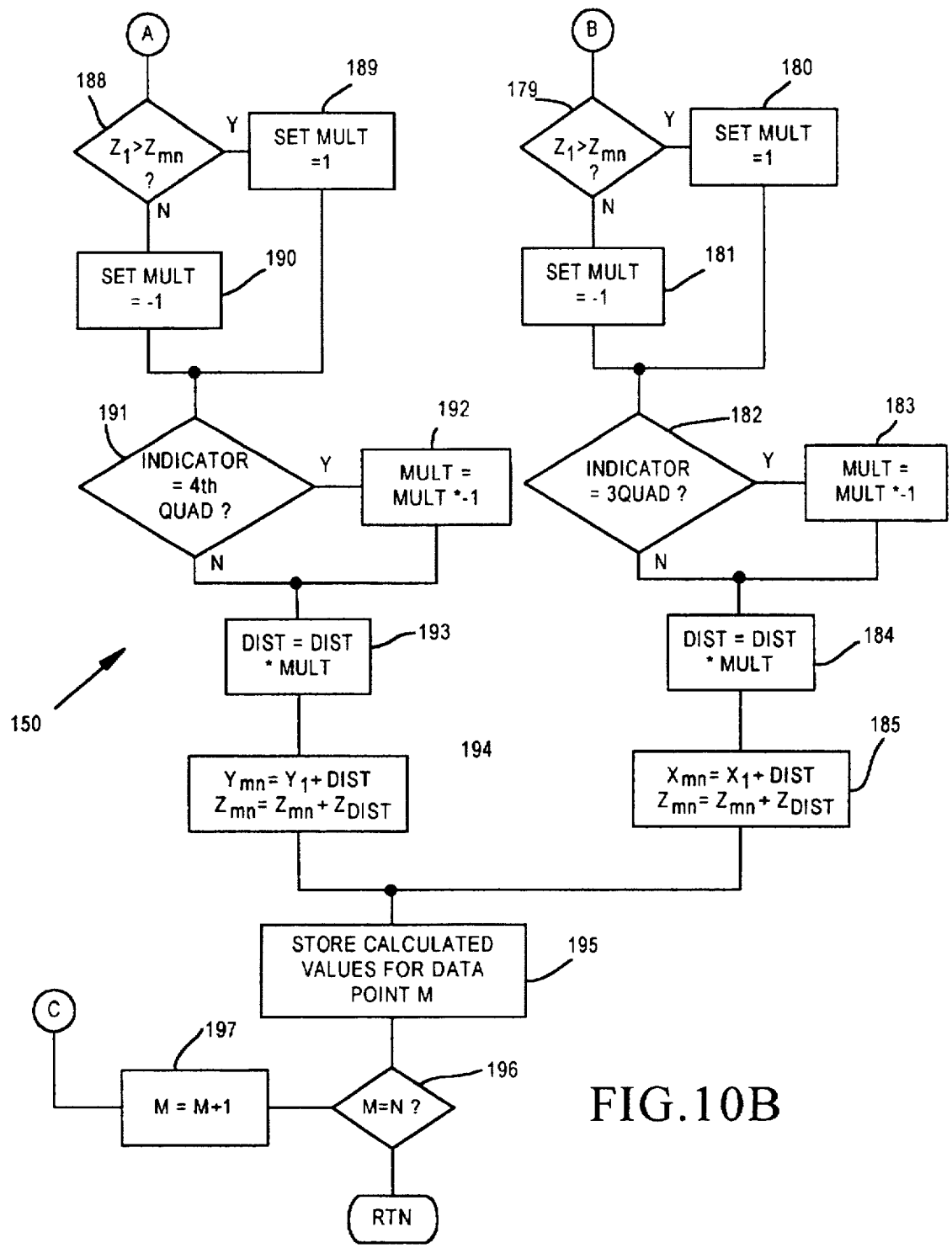
Figure 11A:
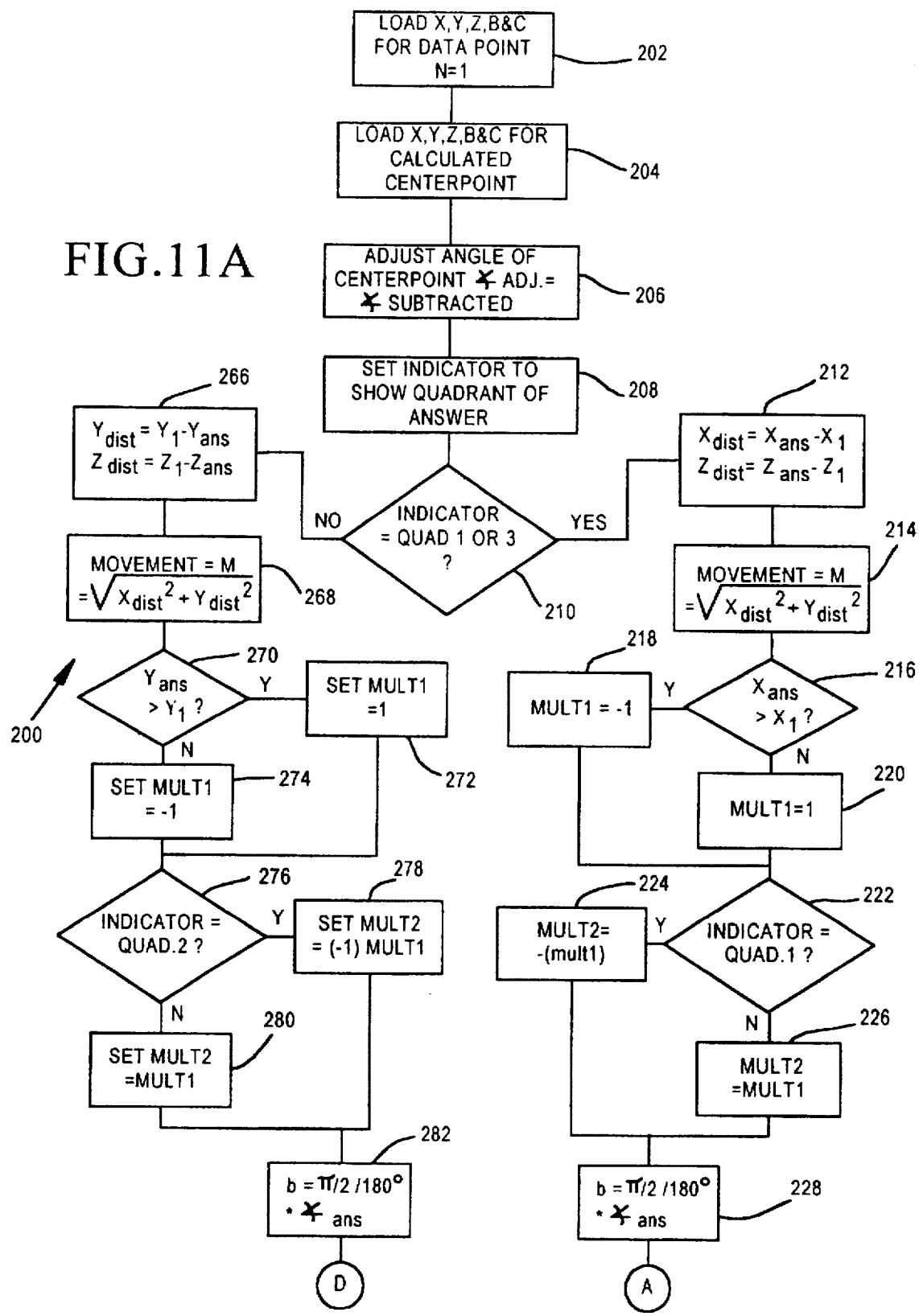
Figure 11B:
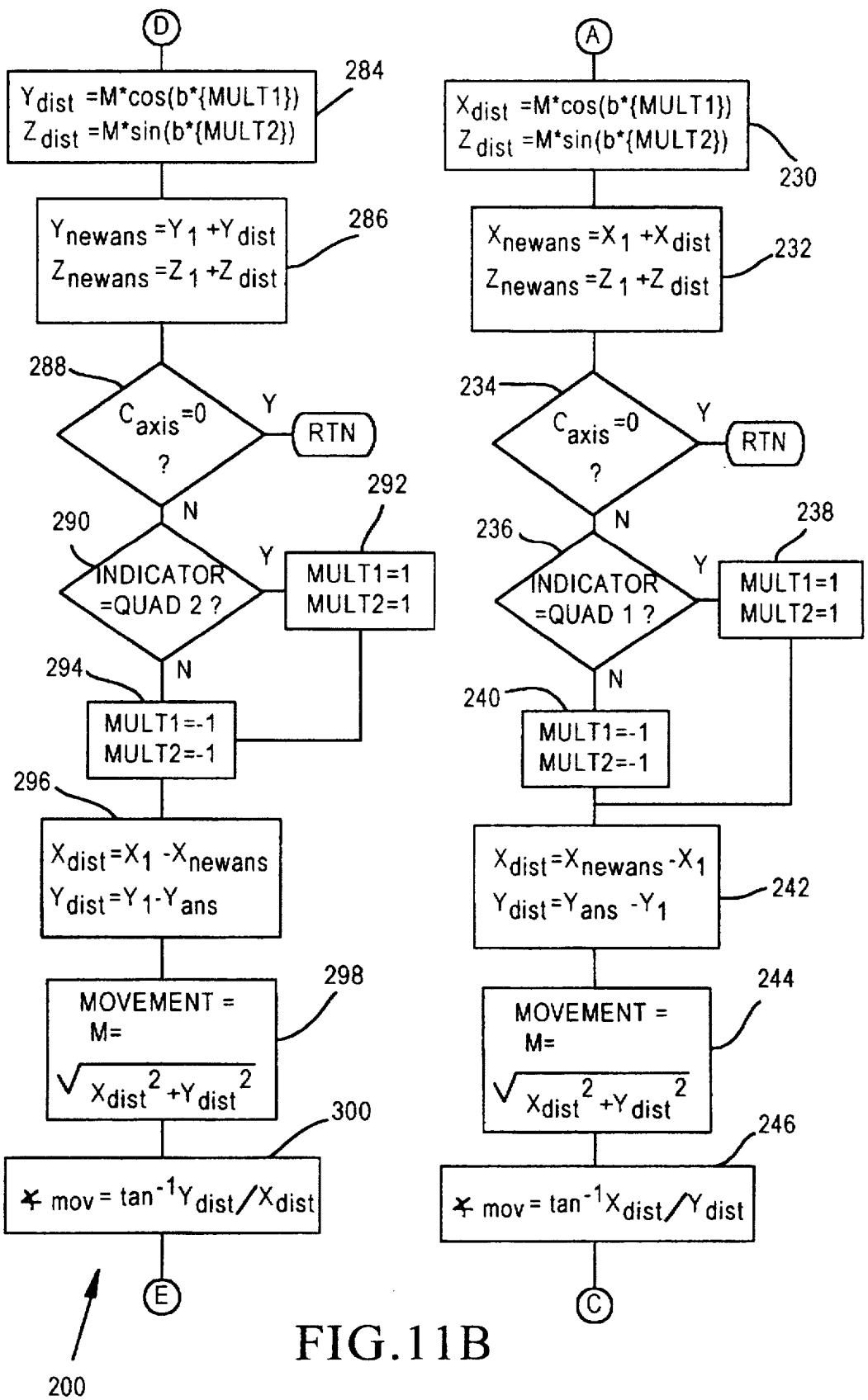
Figure 11C:
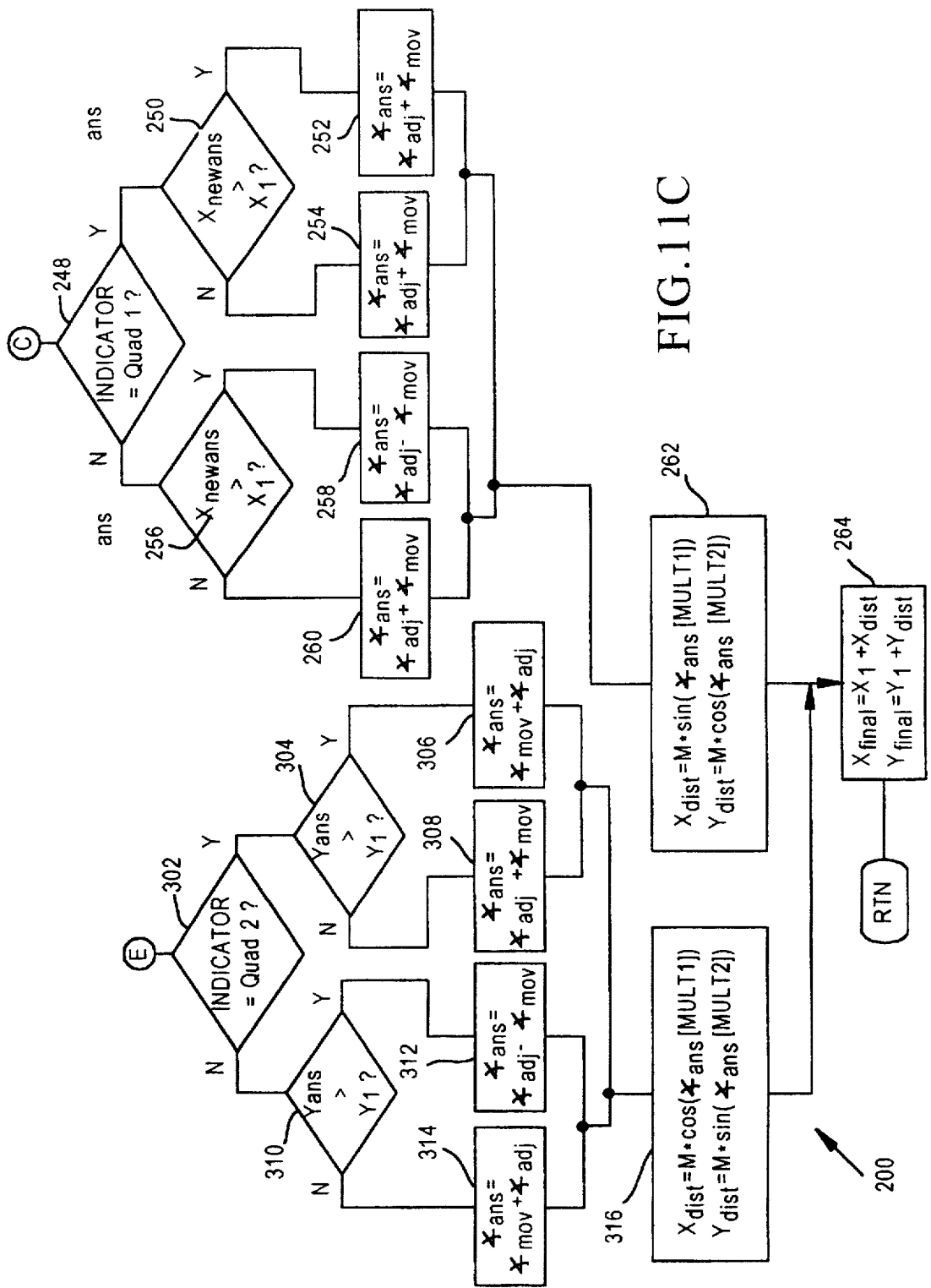

FIGS. 10a, and 10b are a flow chart showing a rotation subroutine invoked by the hole measurement subroutine;

FIGS. 11a, 11b, and 11c are a flow chart showing a counter-rotation subroutine invoked by the hole measurement subroutine;

FIG. 12 is a side view of the probing of the edge of the component; and

Figure 13:
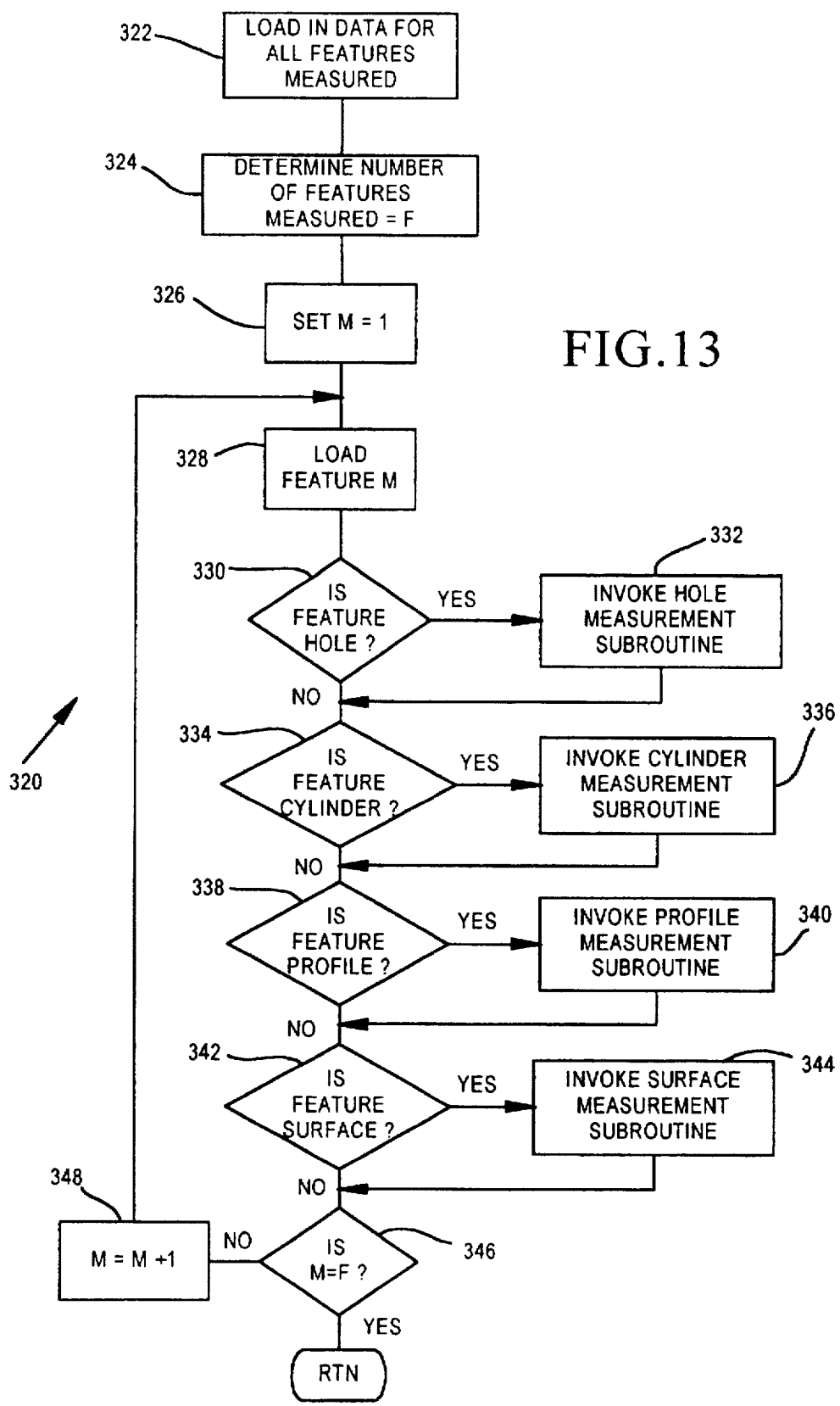

FIG. 13 is a calculation routine of a second embodiment implemented by the CPU that processes multiple features on a component.

DESCRIPTION OF THE PREFERRED EMBODIMENT

Figure 3:
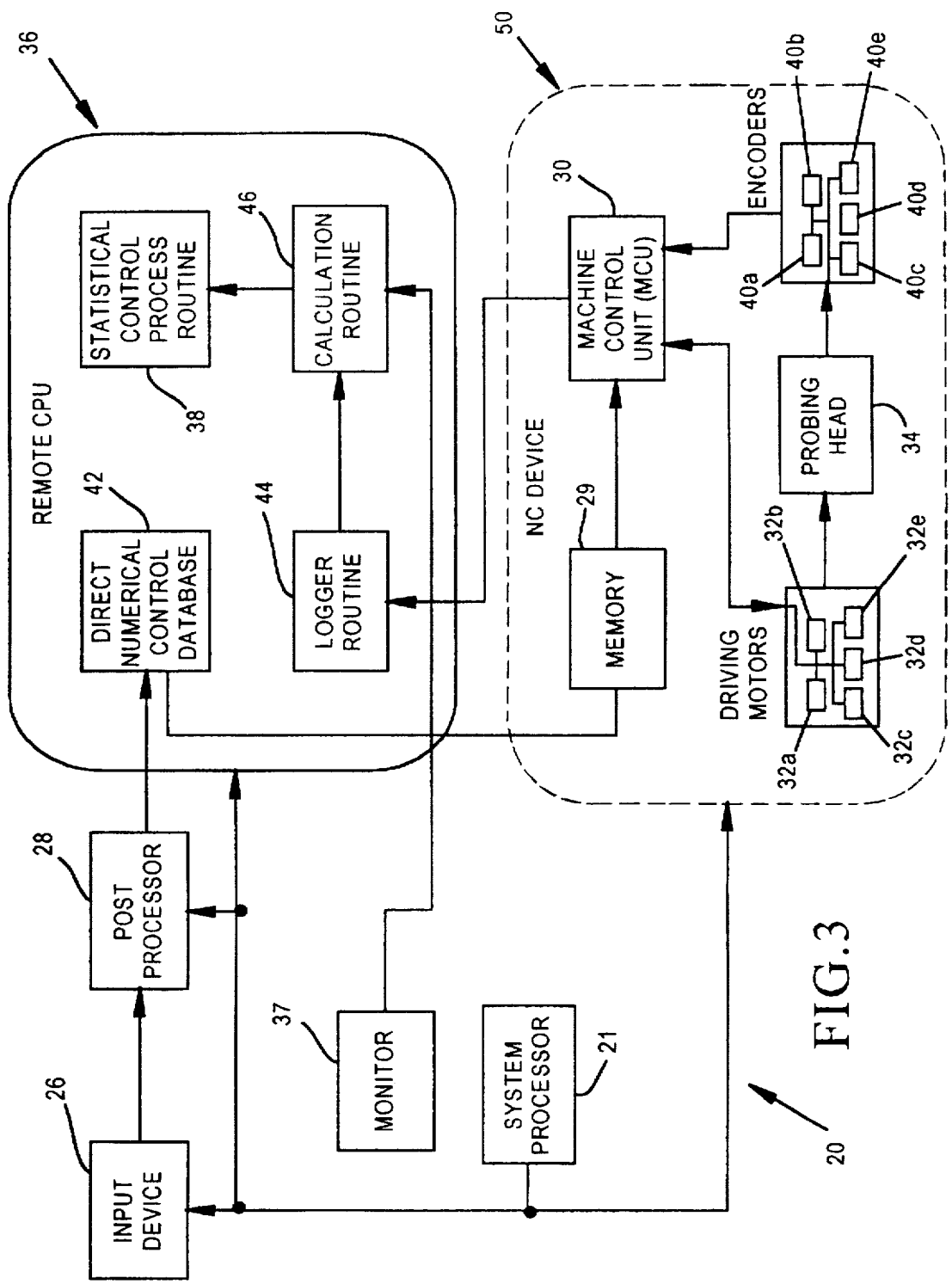
FIG. 3 is a block diagram of an off-line multi-axis NC probing system using the conventional Numerically Controlled device.

As shown in the block diagram of FIG. 3, an off-line multi-axis NC probing system 20 includes an input device 26 for inputting at least one feature, such as a hole, cylinder, surface, or edge, of a component that an operator desires to measure. A post processor 28 outputs a series of work piece instructions for measuring the component at a specified number of data points. The work piece instructions are then stored in a remote CPU 36.

The probing system 20 also includes a numerically controlled (NC) device 50 having a machine control unit (MCU) 30 that processes the work piece instructions stored in the remote CPU 36. The NC device 50 also has motors 32a–32e, which are driven by the MCU 30 to move a probing head 34. Further, the NC device 50 includes encoders 40a–40e that determine a position of the probing head 34 and then store the position in the remote CPU 36. A calculation routine is used by the remote CPU 36 to determine the dimensions of the feature being measured by the NC probing system 20. Further, the probing system 20 includes a monitor 37 that displays the dimensions of the feature and indicates whether the feature is in tolerance, and a statistical process control program 38 residing in the remote CPU 36 to sample the measurement results over time to look for trends in machining tolerance. Finally, a system processor 21 regulates the transfer and processing of information between the input device 26, the post processor 28, the remote CPU 36 and the NC device 50.

The input device 26 is a computer-aided design (CAD) device, such as a pro-E terminal, Auto-CAD or CATIA station. Information, such as the ideal design of the component 48 including ideal dimensions of all its essential features, is input by the operator into a definition file. The definition file is used as a template to assist in the acquisition of actual measured values of the component 48, and specifies tolerances that the actual measured values can deviate from the ideal dimensions. Also, an amount of data points sampled by the probe head 34, per each feature measured on the component 48, is specified in the definition file. Once the definition file has been completed, the input device 26 outputs a "high level" instruction designating which of the features on the component 48 are to be measured.

The post processor 28, as is well known in the art, is a computing device that converts or adapts the "high level" instruction output from the input device 26 into a series of the work piece instructions that can be understood by the MCU 30 of the NC device 50. The post processor 28 uses the definition file described in the "high level" language to create two separate files. The first file created by the post processor 28 is an ideal measurement file, which defines the ideal dimensions of the examined feature of the component 48 for future reference. The second file created by the post processor 28 is a probe head destination file. The second file manipulates the ideal dimensions to designate a destination point of the probe head 34 that lies beyond an expected point of contact for each of the data points. The work piece instructions, containing the first and second files, as well as a location of a "qualification point," used to determine any offset of the NC device 50, are transferred to the remote CPU 36 upon request.

The remote CPU 36 is preferably a computer having substantial computing and memory capacity, such as a UNIX workstation, PC or mainframe. The CPU 36 maintains a direct numerical control (DNC) database 42 that is accessible by the MCU 30. The DNC database 42 is the portion of the CPU 36 responsible for storing the series of the work piece instructions. In a preferred embodiment, the CPU 36 is in communication with a plurality of NC devices each having accessto the information in the DNC database 42. The remote CPU 36 is also capable of running a logger routine 44 that stores all the positional values determined by the encoders 40a–40e. Further, the remote CPU 36 is capable of running a calculation routine 46 that calculates actual specified measurements of the features, such as diameter, using the positional values determined by the encoders 40a–40e. Upon instruction, the series of the work piece instructions stored in the DNC database 42 are transferred to the MCU 30 of the NC device 50.

In a preferred embodiment, the NC device 50 is a computer numerically controlled (CNC) device having a memory 29 that is capable of receiving all the work piece instructions and storing them. The MCU 30 of the NC device 50 sequentially retrieves each of the series of the work piece instructions, and in response outputs a voltage to at least one of the motors 32a–32e to move the probe head 34, such as a standard Renishaw touch type probe head sensor. A probe 35 of the probe head 34 is moved toward the destination point, corresponding to the data point currently being processed, until it comes into contact with the surface of the feature being measured. When the probing head 34 indicates it has made contact with the feature of the component 48, a location of the contact is determined by encoders 40a–40e.

The location of the probe head 34 is reported by the encoders 40a–40e to the MCU 30, as is well known in the art when using a "closed loop" system. The encoders 40a–40e preferably include a light emitting diode (LED) transmitter (not shown), a charge coupled device (CCD) receiver (not shown), and a slotted bar (not shown) located along each axis. Breaks in a light beam from the at least one of the LEDs caused by their corresponding slotted bar interposed between the LED and the CCD, indicate the amount of movement of the probe head 34 parallel to the bar along that particular axis. Further, the MCU 30 is programmed with a G-code, which is one of a group of codes that specify the relationship of the NC device 50 to the component 48. The programmed G-code, in this case G31, is input into the MCU 30 directing it to take a reading from encoders 40a–40e to determine the exact position of the probe 35 of the probe head 34 when it made contact with the surface of the component 48. This recorded position is then sent to the logger routine 44 in the remote CPU 44, where it is stored along with all other data point positions determined by the MCU 30.

Once the locations of all the data points specified by the input device 26 have been determined and stored by the logger routine 44, the CPU 36 invokes the calculation routine 46 which evaluates the recorded position data to measure the feature of the component 48 under current examination. If the recorded position data lies in a plane that is defined by more than 3 axes (i.e., 5 axes), the position data is rotated until it lies in a plane definable by just the x and y axes. The measurements are made, and then specified answer values are counter rotated into their actual position in space. The calculation routine 46 also compares the actual measurements of the feature with the ideal measurements of the feature to determine how much deviation between the two exists, and whether the feature of the component 48 being measured is within tolerance. The measurements and conformance or variation from tolerances are then formatted and stored in a file within the remote CPU 36 for later display.

The monitor 37 displays the measurements calculated by the calculation routine 46, as well as the deviations of these measurements from the ideal dimensions of the designated features of the component 48. Further, the statistical process control program 38 located in the remote CPU 36 is capable of inputting the stored files of calculation routine from machining operations occurring over a period of time. The files are examined to look for trends in the data output on the monitor 37 over time, and is capable of assisting in the determination of when a particular tool, such as a drill, of the NC device 50 should be replaced.

Figure 1A:
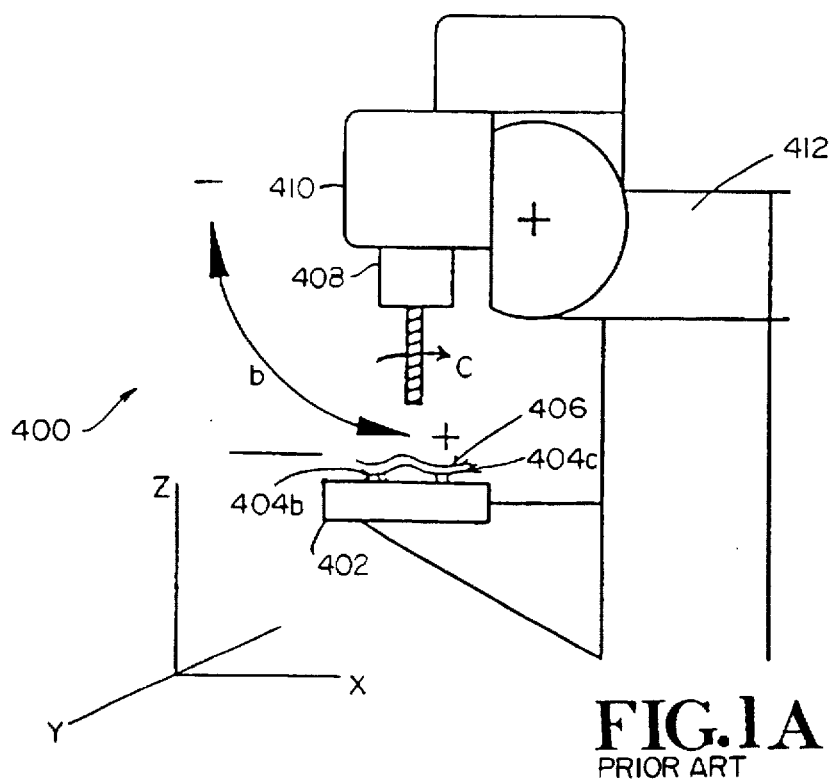
FIG. 1b is a front view of a conventional Numerically Controlled (NC) device.
Figure 1B:
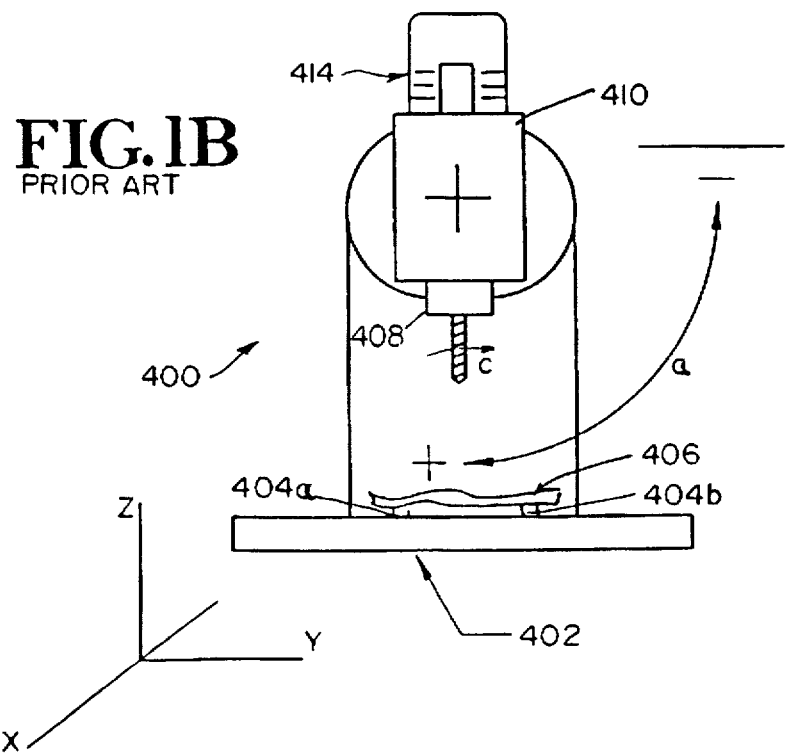
Figure 2:
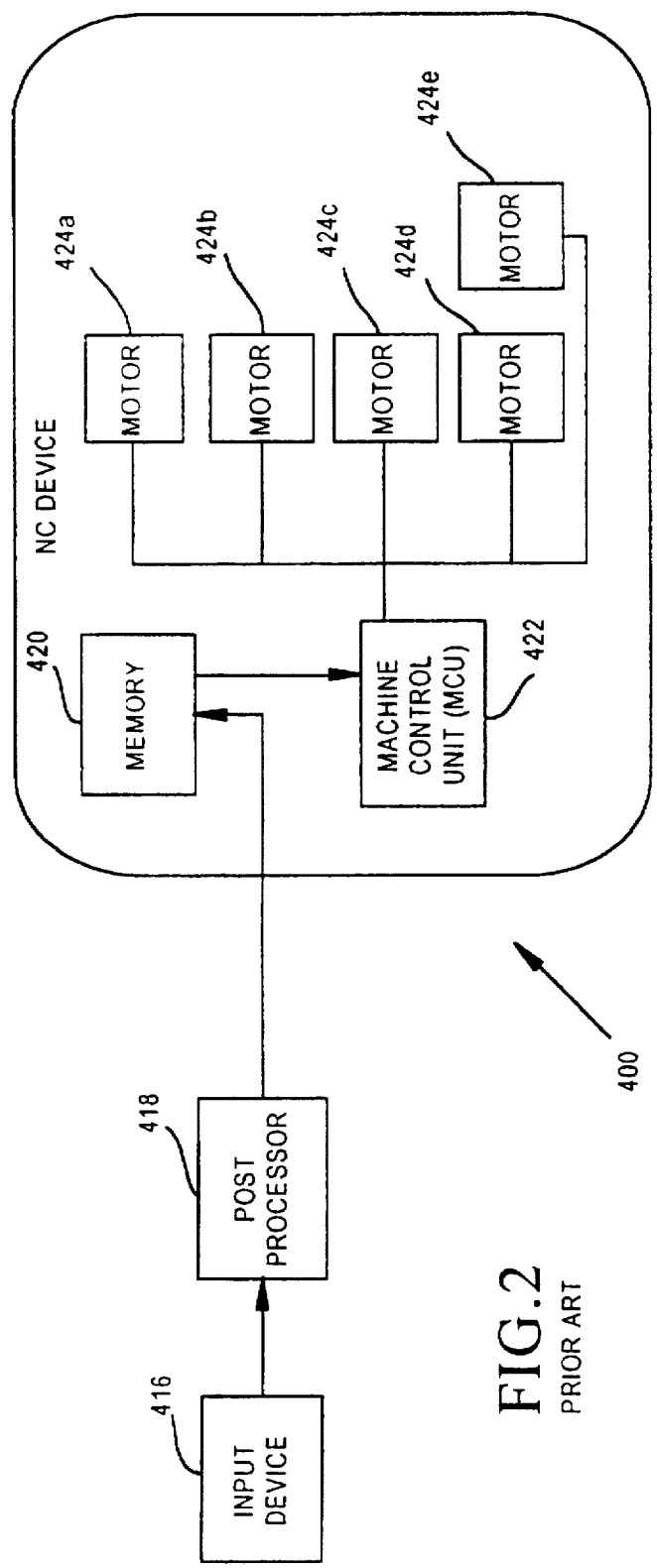
FIG. 2 is a block diagram of components included in the conventional Numerically Controlled device.
Figure 4:
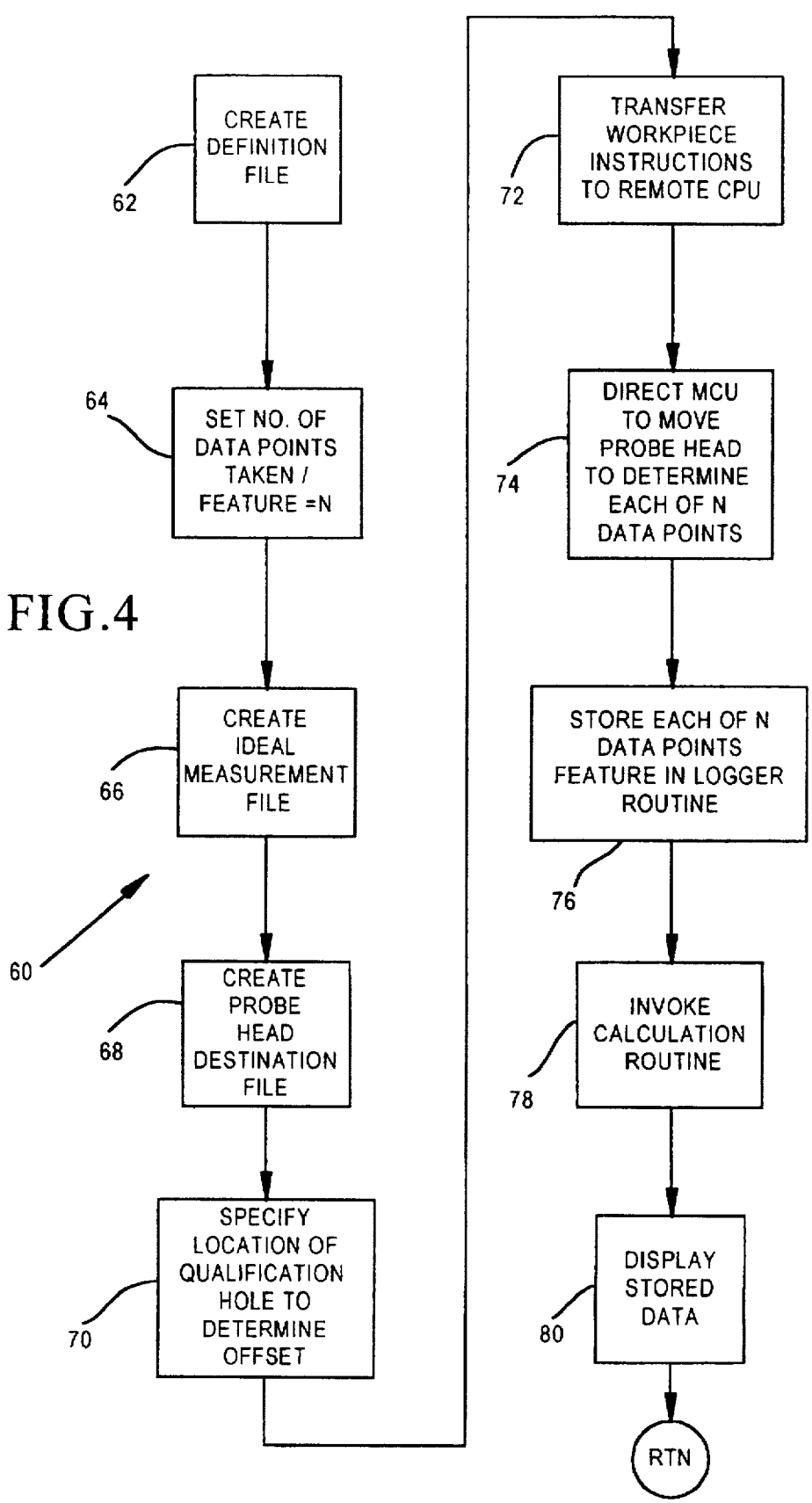
FIG. 4 is a flow chart depicting a main routine implemented by a system processor of the probing system.
Figure 7A:
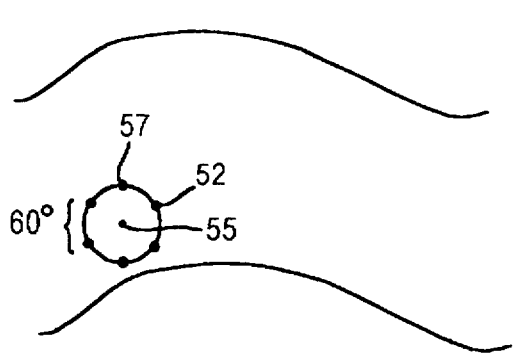
FIG. 7a is a top view of the hole in the component.

In a first embodiment, the probing system 20, as shown in FIG. 3, is used to measure the center point 55 and diameter 60 of a hole, shown in FIGS. 6 and 7a, that was drilled by the NC device 50 while operating in 5 axes. When drilled by a device that uses 5 axes, the length of the hole is not orthogonal to either an (x,y), (x,z), or (y,z) plane as conventionally defined and shown in FIGS. 1a and 1b. FIG. 4 shows a series of program instruction coordinated by the system processor 21 to direct the probing and measurement of the hole 52, even though it does not lie in the (x,y) plane, as shown in FIG. 6. Flowcharts from which source code can be written by one skilled in the art are illustrated in FIGS. 4, 8, 9, 10a, 10b, 11a, 11b, 11c, and 13.

Referring to FIG. 4, a main routine 60, which is executed by the system processor 21, begins at step 62 by creating a definition file in the input device 26 that specifies the ideal dimensions of the hole 52, in this case an ideal center point and diameter are specified. Also, the acceptable tolerance of the ideal dimensions are specified in the definition file. Next, the number of the data points to be taken along the inner surface of the hole 52, as determined by an operator, is input to the device 26 by the system processor 21 in step 64. In a preferred embodiment, 6 data points, out of a possible 3 to 19 different data points are taken of the inner surface 57 of the hole 52, as shown in FIG. 7a. Once input, the definition file and the number of data points are described in the "higher" level language of the input device 26, which is preferably a CAD workstation.

In step 66, the system processor 21 transfers the "high level" language utilized in creating the definition file to the post processor 28. The post processor 28 creates the ideal measurement file, which describes the ideal diameter and center point of the hole 52, as a series of work piece instructions in a machine code data (MCD) such as the language APT (automatic programming of tools) that can be understood by the MCU 30.

Next, in step 68, the system processor 21 transfers the definition file to the post processor 28 a second time. This time the post processor 28 creates the probe head destination file which is also a series of work piece instructions in the same MCD as the ideal measurement file. The probe head destination file determines the distance expected between data points taken along the ideal diameter from the ideal center point of the hole 52, and then adds some distance to them to create a series of destination points lying beyond the anticipated inner surface of the hole 52. For example, if the distance between the center point 55 and a point on the inner surface 57 is "r", as shown in FIG. 7a, then the destination distance for the corresponding data point is set to 2*r from the center point 55. The probe head destination file also sets the spacing between the data points as equidistant. Thus, if 6 data points have been requested in step 64, then each data point will be spaced 360 degrees/6=60 degrees around the inner surface 57, as shown in FIG. 7a.

Figure 5:
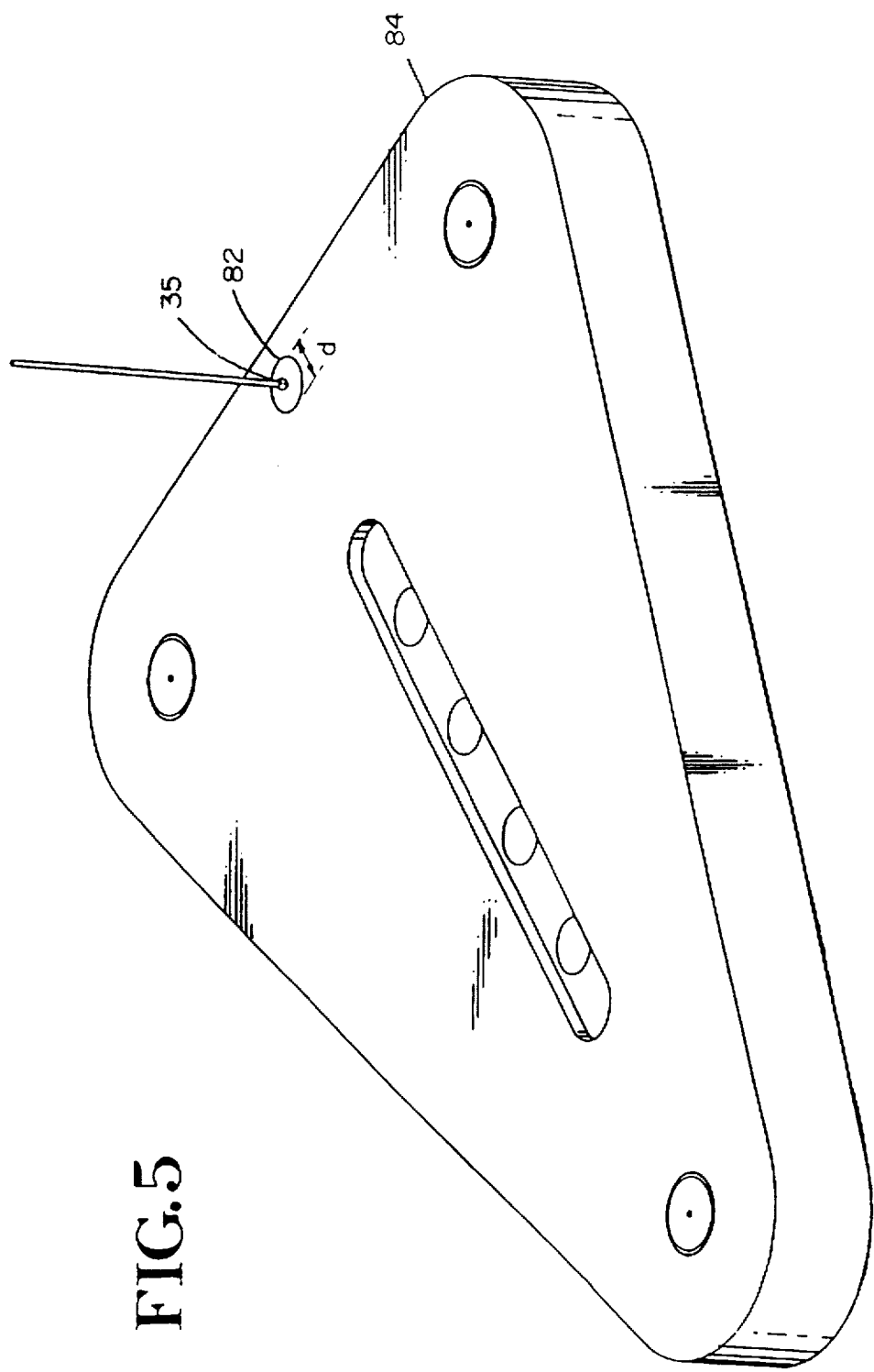
FIG. 5 is an isometric view of a probe head of the NC device within a template used in a probe qualification process.

Next, in step 70, the system processor 21 requires the post processor 28 to specify a known location and dimensions of a qualification hole 82 found on a table 84 of the NC device 50, as shown in FIG. 5 and to create a series of work piece instruction to direct the probe 35 to that location. The qualification hole 82 will be measured by the probe 35, prior to taking any data points, to determine if the NC device 50 is aligned. If the NC device 50 is not properly aligned, then the actual location of the qualification can be used to determine an offset to compensate for the discrepancy, as is well known in the art.

Next, in step 72, the system processor 21 transfers all the work piece instructions including the ideal measurement file, the probe head destination file, and the qualification hole location, to the direct numerical control (DNC) database 42 of the remote CPU 36. The direct numerical control database is capable of communication with a plurality of NC devices. In the present embodiment, the DNC database 42 is accessible by the memory 29 of the NC device 50.

In step 74, the system processor 21 transfers all the work piece instructions to the memory 29, where they are sequentially accessed by the MCU 30. The MCU 30 then proceeds to send out a voltage to at least some of driving motors 32a–32e to move the probe head 34 according to the work piece instructions. First, an offset is determined (if necessary) using the qualification hole 82, as described above. Next, the MCU 30 processes the probe head destination file and proceeds to move the probe head 34 toward the component 48, as shown in FIG. 6.

The probe 35 is moved at high speed toward the component 48 until it has reached approximately three quarters the distance to the hole 52. Then, the probe 35 is slowly lowered a distance "1" on a path along the ideal center point 55, until it has theoretically penetrated the hole a distance "d", as defined by the work piece instructions. Next, the probe head is moved to its first destination corresponding to a first data point, defined by the destination file. If the probe 35 reaches its destination, an error signal indicator (not shown) is lit to alert the operator that the probe 35 did not penetrate the hole 52 as intended. If, however, the probe 35 did penetrate the hole, then the probe 35 will be prematurely stopped and its position determined by at least one of encoders 40a–40e. This movement from the center point 55 to a destination will be repeated for every data point until the position of each data point has been determined.

Figure 7B:
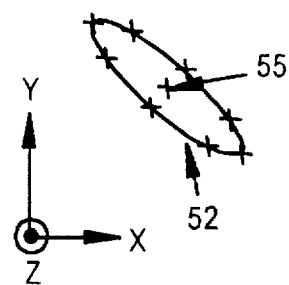
FIG. 7b is a circle in 3d space representing the center and diameter of the hole.

In step 76, the system processor 21 stores the position of each of the data points along the (x,y, and z) axes in the logger routine 44 of the remote CPU 36. Next, in step 78, the system processor 21 causes the remote CPU 36 to invoke the calculation routine 46, as shown in FIG. 8, which calculates the actual center point 55 of the hole 52 and its diameter 60, even if the hole 52 was drilled using a 5 axes NC device, and does not lie within the (x,y) plane, as shown in FIG. 7b.

Figure 8:
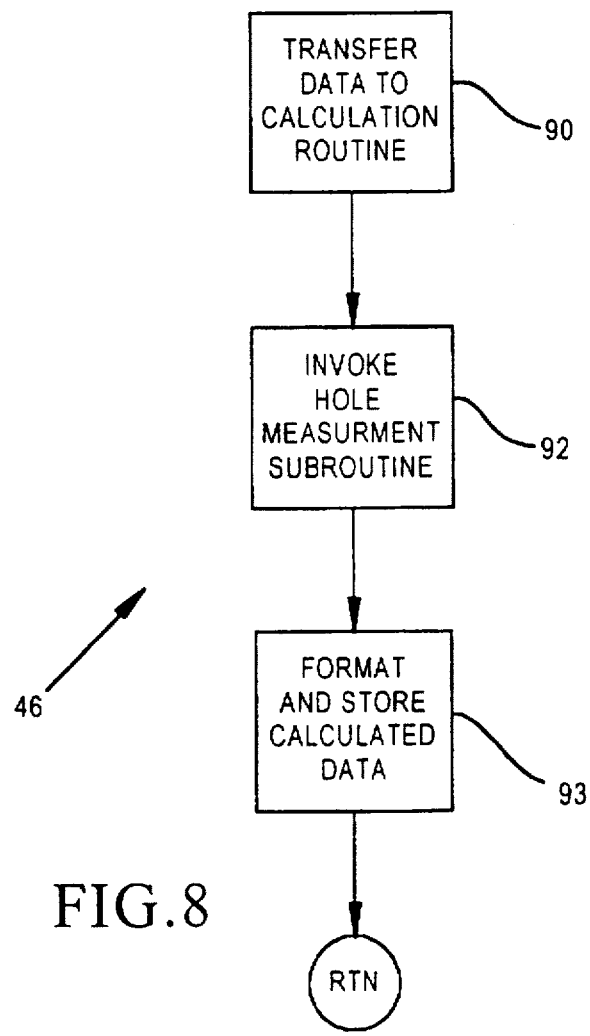
FIG. 8 is a flow chart showing a calculation routine of a first embodiment implemented by a remote Central Processing Unit (CPU)

Initially, as shown in FIG. 8, the remote CPU 36 begins the calculation routine at step 90 by loading in the positions of the data points that have been stored in the logger routine 44 as well as relevant portions of the ideal measurement file and transferring them to the calculation routine 46. Next, in step 92, the remote CPU 36 invokes a hole measurement subroutine 100, shown in FIG. 9.

The hole measurement subroutine 100, invoked by the remote CPU 36 during the calculation routine 46, starts at step 102, where it enters the "n" number and position of the data points taken in the hole 52. In step 104, the CPU 36 determines whether the diameter 57 of the hole 52 lies in the (x,y) plane and is capable of being calculated without any rotation of the measured data points. If rotation of the data points is not required, then the CPU 36 proceeds to step 106 and calculates the measured diameter and center of the hole 52 using a series of simultaneous equations commonly referred to as a "least squares algorithm," which is well known in the art. The remote CPU 36 then proceeds to step 113, where the offset of position measurements due to the size of the probe 35 are compensated for by adding the effective diameter of the probe 35 to the calculated diameter.

However, if in step 104, the remote CPU 36 determines that the diameter of the hole 52 does not lie in the (x,y) plane, then the remote CPU 36 proceeds to step 110 where it invokes a rotation subroutine 150, as shown in FIG. 10.

In the rotation subroutine 150, the remote CPU 36 begins from step 152 by loading a first of the data points, which is also referred to as the anchor point. It is around the first point that all rotation of the data points of the hole 52 will occur, to place them in the (x,y) plane. Next, in step 154, the remote CPU 36 sets a counter equal to two, which indicates the next data point to be loaded by the CPU 36 in step 156.

Figure 7D:
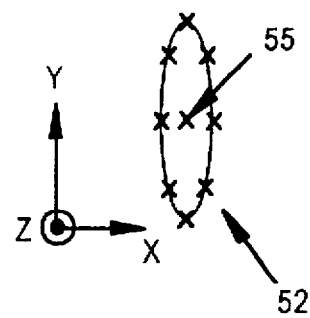
FIG. 7d is the circle in 3d space after a rotation or counter-rotation.
Figure 7C:
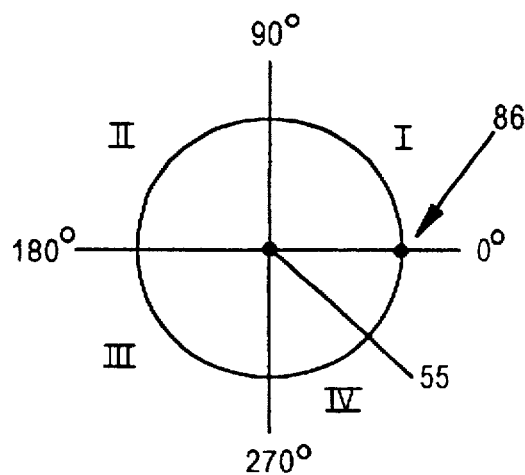
FIG. 7c is a diagram depicting the division of the hole into polar coordinates.

As shown in FIG. 7c, the hole 52 is divide into four quadrants to assist in changing cartesian coordinates to polar coordinates, with 0 degrees being defined by the first data point 86. Moving counter-clockwise, the first quadrant is from 0 degrees to 90 degrees, the second quadrant is from 90 degrees to 180 degrees, the third quadrant from 180 to 270 degrees, and the fourth quadrant from 270 to 360 degrees. In step 158 of the rotation subroutine 150, the CPU 36 determines what quadrant the data point, which is currently being evaluated, resides in. Then, the CPU 36 subtracts a multiple of 90 degrees to bring the data point's value into the first quadrant for more efficient processing. For example, if the data point was taken on the hole at 230 degrees counter-clockwise from the first data point, then 180 degrees is subtracted from it and its new value is 50 degrees. Next, in step 160 the data point is tagged with an indicator, which identifies from which quadrant the data point originated.

In step 162, the CPU 36 calculates the distance between the current data point and the first data point as follows:

$$X_{dist(m)} = X_m - X_1, \text{ and } Y_{dist(m)} = Y_m - Y_1.$$

Next, in step 164, the amount of movement between the two points is calculated using the Pythagorean theorem, as is well known in the art.

In the next few steps, the CPU 36 begins to manipulate the data point so that the hole 52 will change from its position in FIG. 7b to a new position completely parallel to the Y axis, as shown in FIG. 7d. First, in step 166, the CPU 36 checks the data point to see if it already parallel to the Y axis, if so, it proceeds to step 167 and sets angle (m)=0. However, if the CPU 36 determines that the first point and the current data point do not define a line that is parallel to the Y-axis, then the CPU 36 proceeds to step 168 and calculates the angle (m) as follows:

$$\text{angle}_{(m)} = \text{inverse tangent}(X_m/Y_m).$$

In either case, the CPU 36 then proceeds to step 169 where it checks if the value of Y, for the first data point, is greater than the value of Y for the current data point (m). If the CPU 36 determines that the value of Y for the first data point is greater, it proceeds to step 170, and sets a multiplier {MULT} to (−1); however, if the CPU 36 determines in step 169 that the value of Y for the current data point is greater, then it sets the multiplier to 1 in step 171. Again, in step 172, the CPU 36 checks to see if the current data point is parallel with the Y-axis by checking if the angle$_{(m)}$=0. If it is not, then in step 173, the CPU 36 resets the angle$_{(m)}$ as follows:

$$\text{angle}_{(m)} = (\pi/2 - (\text{angle}_{(m)} * \pi/2) + \text{angle}_{(m)}).$$

Then, in step 174, the CPU 36 calculates a new value for $X_m$ and $Y_m$ as follows:

$$X_m = \{MULT\} * X_{dist(m)} * \cos(90 - \text{angle}_{(m)}), \text{ and}$$

$$Y_m = \{MULT\} * Y_{dist(m)} * \sin(\text{angle}_{(m)}) + Y_m]$$

and proceeds to step 175. In step 175, $X_{mn}$ and $Y_{mn}$, which are the current data points, are calculated using the following equations:

$$X_{mn} = X_1 + X_m, \text{ and } Y_{mn} = Y_1 + Y_m$$

If in step 172, the CPU 36 determines that the angle $_{(m)}$ is equal to zero, then it proceeds directly to step 176.

Figure 7E:
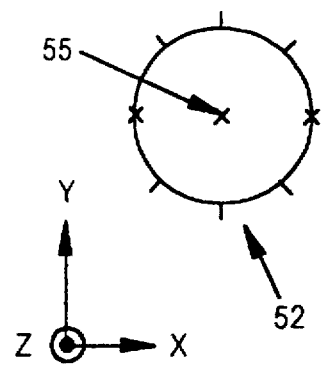
FIG. 7e is the circle in 2d space after a complete rotation.

In the following steps, the CPU 36 manipulates the current data point from being parallel to the Y-axis, as shown in FIG. 7(d) to lying in the (x,y) plane, as shown in FIG. 7(e). First, the CPU 36, in step 176, checks the current data point's indicator. If the indicator shows that the data point originated in the first or third quadrant, then the CPU 36 proceeds to step 177 and calculates Xdist and Zdist as follows:

$$X_{dist} = X_1 - X_{mn}, \text{ and } Z_{dist} = Z_1 - Z_{mn}.$$

In step 178 the CPU 36 calculates the distance as follows:

$$dist=\sqrt{X_{dist}^2+Z_{dist}^2}$$

Then, if the CPU 36, in step 179, determines that the first Z is greater than the current data point (m) for Z, the CPU 36 proceeds to step 180 which sets the MULT factor to 1. Otherwise, CPU 36 proceeds to step 181 which sets the MULT factor to −1.

If the CPU 36, in step 182, determines that the current data point originated from the third quadrant, then it proceeds to step 183 which reverses the sign of the MULT factor and proceeds to step 184 which calculates dist as follows:

$$dist=dist*MULT$$

The CPU 36 then proceeds to step 185 and calculates the new current data points for X and Z as follows:

$$X_{mn}=X_1+dist, \text{ and } Z_{mn}=Z_{mn}+Z_{dist}.$$

Then, the CPU 36 proceeds to step 195 which stores the calculated values for data point m.

If the CPU 36 in step 176, determines whether the current data point (m) is in the second or fourth quadrant, then it proceeds to step 186 which calculates the Y dist and Zdist as follows:

$$Y_{dist}=Y_1-Y_{mn}, Z_{dist}=Z_1-Z_{mn}$$

and proceeds to 187, which calculates dist as follows:

$$dist=\sqrt{Y_{dist}^2+Z_{dist}^2}$$

If the CPU 36, in step 188, determines that the first Z is greater than the current data point (m) for Z, then the CPU 36 proceeds to step 189 which sets the MULT factor to 1. Otherwise CPU 36 proceeds to step 190 which sets the MULT factor to (−1). If the CPU 36, in step 191, determines that the current data point originated from the fourth quadrant, then it proceeds to step 192 which reverses the sign of the MULT factor and proceeds to step 193 which calculates dist as follows:

$$dist=dist*MULT$$

and proceeds to step 194 which calculates the new current data points for Y and Z as follows:

$$Y_{mn}=Y_1+dist, \text{ and } Z_{mn}=Z_{mn}+Z_{dist}$$

Then the CPU 36 proceeds to step 195 which stores the calculated values for data point In step 195, the CPU 36 stores the rotated values describing the current data point. Next, in step 196, the CPU 36 checks to see if any more data points need to be rotated, and if there are, it increments the value of m in step 197 and repeats the routine starting at step 156. Once the CPU 36 determines that all the data points have been rotated it returns to step 110 of the hole measurement subroutine 100, shown in FIG. 9, and proceeds to step 112.

In step 112 of the hole measurement subroutine 100, the CPU uses the values of the data points after they had been rotated to the (x,y) plane by the subroutine 150. These simplified values are quickly processed and easily used to calculate the measured center and diameter of hole 52 with the least squares algorithm (described above), as is well known in the art. The CPU 36 then proceeds to step 113, and adds the effective diameter of the probe 35 to the calculated diameter of the hole to compensate for the inward offset of the probe. However, for the calculated answer, i.e., the center point 55, to be of use to an operator, it must be counter-rotated to its prior orientation. Accordingly, the CPU 36 proceeds to step 114, and invokes a counter-rotation subroutine 200, as shown in FIGS. 11a, 11b, and 11c.

The CPU 36 begins the counter-rotation subroutine 200 at step 202, shown in FIG. 11a by loading the positional data of the first data point. Next, in step 204, the CPU 36 loads the calculated position of the center point 55. As was performed in the rotation subroutine, the CPU 36, in step 206, divides the hole 52 into four quadrants, as shown in FIG. 7c, and then subtracts a multiple of 90 degrees to place the data point in the first quadrant. Then, the angle subtracted from the original angle is stored in memory as an adjustment angle, angle$_{(adj)}$. In step 208, the CPU 36 tags the answer or center point 55 with an indicator showing which quadrant it was originally placed in.

In step 210, the CPU 36 determines if the answer point 55 was originally located in quadrants 1 or 3. If it is, then the CPU 36 proceeds to step 212 where it calculates the distance between the first data point and the answer point 55 along the X and Z axes as follows:

$$X_{dist}=X_{ans}-X_1, Z_{dist}=Z_{ans}-Z_1.$$

In step 214 the CPU 36 uses the X and Z distance measurements to calculate the amount of distance or movement between the two points using the Pythagorean theorem, and the movement is stored as a value m. Next, in step 216, the CPU 36 determines whether the value of X for the answer is greater than the value of X for the first data point. If $X_{ans}>X_1$, then the CPU 36 proceeds to step 218 and sets a multiplier 1 (MULT1) to a value of 1. However, if the CPU 36 determines that $X_{ans}$ is not greater than $X_1$, then MULT1 is set equal to (−1) in step 220. Once the multiplier has been set in either steps 216 or 220, the CPU 36 then proceeds to step 222.

In step 222, the CPU 36 determines whether the quadrant indicator of the answer point 55 shows the answer point 55 as originating in quadrant 1. If it does, then the CPU 36 proceeds to step 224 and sets a second multiplier (MULT2) equal to (−1)(MULT1), and then proceeds to step 228. However, if the CPU 36 determines that the answer point 55 came from the third quadrant, then it sets MULT2=MULT1 in step 226. In step 228, the CPU 36 converts the angular value of b to radians and proceeds to step 230.

Next, in step 230, as shown in FIG. 11b, the CPU 36 calculates a new X distance and a new Z distance using the value of the movement (M), which was calculated in step 214, and the value of b, which was calculated in step 228. The new distance values are calculated as follows:

$$X_{dist}=M*\cos(b*\{MULT1\}), \text{ and } Z_{dist}=M*\sin(b*\{MULT2\}).$$

The distance values are used to counter-rotate the answer point 55 in the (x,z) plane from a position as shown in FIG. 7e to a position as shown in FIG. 7d. In step 232, the CPU 36 performs the first counter-rotation by adding the newly calculated X and Z distances to their respective values of the initial data point using the following equations:

$$[X_{newans}=X_1+X_{dist}, \text{ and } Z_{newans}=Z_1+Z_{dist}].$$

Next, in step 234, the CPU 36 determines whether any further counter-rotation is necessary by checking the value of the C-axis. If the C-axis is zero, then the CPU 36 returns to the hole measurement subroutine 100. However, if the C-axis is not zero, when the CPU 36 proceeds to step 234, where it determines if the answer originated in quadrant 1. If the answer point originated in the first quadrant, then the CPU 36 sets MULT1=MULT2=1 in step 238, and if it is not from that quadrant, then the CPU 36 sets MULT1=MULT2= (−1), in step 240.

Next, the CPU 36 proceeds to counter-rotate the answer point 55 in the (x,y) plane from its position shown in FIG. 7d to its final position shown in FIG. 7b. In step 242, an X and Y distance of travel between the first data point and the answer point 55 in the (x,z) plane are calculated using the new answer values as follows:

$$X_{dist}=X_{newans}-X_1, \text{ and } Y_{dist}=Y_{ans}-Y_1$$

The distance, or movement between the first data point and the answer point is then calculated in step 244 by the CPU 36 using the Pythagorean theorem. Further, in step 246, the angle of movement, angle(mov) is calculated using the equation:

$$\text{angle}_{(mov)}=\text{inverse tangent}(X_{dist}/Y_{dist}).$$

In step 248, as shown in FIG. 11c, the CPU 36 determines whether the answer point 55 originated in quadrant 1, and if it did, then the CPU 36 proceeds to step 250, where it compares $X_{newans}$ with the $X_1$, which is the X value of the first data point. If $X_{newans}>X_1$, then in step 252, the CPU 36 sets an angular answer as the sum of the adjusted angle, $\text{angle}_{(adj)}$, and the angle of movement, $\text{angle}_{(mov)}$. If, however, $X_{newans}$ is not greater than $X_1$, then the CPU 36 sets the angular $_{answer}=\text{angle}_{(adj)}-\text{angle}_{(mov)}$. If in step 248, the CPU 36 determines that the answer point 59 originated at quadrant 3, then it proceeds to step 256 and determines whether $X_{newans}>X_1$. If $X_{newans}>X_1$, then the CPU 36 sets the angular $_{answer}=\text{angle}_{(adj)}-\text{angle}_{(mov)}$ in step 258. However, if $X_{newans}$ is not greater than $X_1$, then the CPU 36 proceed to step 260 and sets the angular $_{answer}=\text{angle}_{(adj)}+\text{angle}_{(mov)}$. The CPU 36 then proceeds to steps 262 and calculates the distance of travel along the X-axis and the Y-axis using the following equations:

$$X_{dist}=M*\sin(\text{angle}_{(ans)}(\text{MULT1})), \text{ and } Y_{dist}=M*\cos(\text{angle}_{(ans)})(\text{MULT2})).$$

Then, in step 264, the CPU 36 calculates the final value of the answer point 55.

If, in step 210, shown in FIG. 11a, the CPU 36 determined that the answer point 55 originated in either quadrant 2 or quadrant 4, instead of the previously discussed location in either quadrants 1 or 3, then it proceeds step 266.

In step 266 the CPU 36 calculates the distance between the first data point and the answer point along the Y and Z axes as follows:

$$Y_{dist}=Y_1-Y_{ans}, \text{ and } Z_{dist}=Z_1-Z_{ans}$$

In step 268 the CPU 36 uses the Y and Z distance measurements to calculate the amount of distance or movement between the two points using the Pythagorean theorem, and the movement is stored as a value M.

Next, in step 270, the CPU 36 determines whether the value of $Y_{ans}$ for the answer is greater than the value of $Y_1$ for the first data point. If $Y_{ans}>Y_1$, then the CPU 36 proceeds to step 272 and sets a multiplier 1 (MULT1) to a value of 1. However, if the CPU 36 determines that $Y_{ans}$ is not greater than $Y_1$, then MULT1 is set equal to (−1) in step 274. Once the multiplier has been set in either steps 272 or 274, the CPU 36 then proceeds to step 276, where it determines whether the indicator shows the answer point 55 as originating in quadrant 2. If it does, then the CPU 36 proceeds to step 278 and sets a second multiplier(MULT2) equal to (−1)(MULT1), and then proceeds to step 282. However, if the CPU 36 determines that the answer point came from the fourth quadrant in step 276, then it sets MULT2=MULT1 in step 280. In step 282, the CPU 36 converts the angular value of b to radians and proceeds to step 284.

Next, in step 284, as shown in FIG. 11b, the CPU 36 calculates a new Y distance and a new Z distance using the value of the movement (M), calculated in step 268, and the value of b, calculated in step 282. The new distance values are calculated as follows:

$$Y_{dist}=M*\cos(b*\{\text{MULT1}\}), \text{ and } Z_{dist}=M*\sin(b*\{\text{MULT2}\}).$$

The distance values are used to counter-rotate the answer point in the (x,z) plane from a position as shown in FIG. 7e to a position as shown in FIG. 7d. In step 286, the CPU 36 performs the first counter-rotation by adding the newly calculated Y and Z distances to their respective values of the initial data point using the following equations:

$$Y_{newans}=Y_1+Y_{dist}, \text{ and } Z_{newans}=Z_1+Z_{dist}.$$

Next, in step 288, the CPU 36 determines whether any further counter-rotation is necessary by checking the value of the C-axis. If the C-axis is zero, then the CPU 36 returns to the hole measurement subroutine 100. However, if the C-axis is not zero, then the CPU proceeds to step 290, where it determines if the answer originated in quadrant 2. If the answer point originated in the second quadrant, then the CPU 36 sets MULT1=MULT2=1 in step 292, and if it is not from that quadrant, then the CPU 36 sets MULT1=MULT2= (−1), in step 294.

Next, the CPU 36 proceeds to counter-rotate the answer point 55 in the (x,y) plane from its position shown in FIG. 7d to its final position shown in FIG. 7b. In step 296, an X and Y distance of travel between the first data point and the answer point 55 in the (x,z) plane are calculated using the new answer values as follows:

$$X_{dist}=X_1-X_{newans}, \text{ and } Y_{dist}=Y_1-Y_{ans}$$

The distance, or movement between the first data point and the answer point is then calculated in step 298 by the CPU 36 using the Pythagorean theorem. Further, in step 300, the angle of movement, angle(mov) is calculated using the equation:

$$\text{angle}_{(mov)}=\text{inverse tangent}(X_{dist}/Y_{dist}).$$

In step 302, as shown in FIG. 11c, the CPU 36 determines whether the answer point 55 originated in quadrant 2, and if it did, then the CPU 36 proceeds to step 304, where it compares $Y_{ans}$ with the $Y_1$, which is the Y value of the first data point. If $Y_{ans}>Y_1$, then in step 306, the CPU 36 sets an angular answer as the sum of the adjusted angle, $\text{angle}_{(adj)}$, and the angle of movement, $\text{angle}_{(mov)}$. If, however, $Y_{ans}$ is not greater than $Y_1$, then the CPU 36 sets the angular $_{answer}=\text{angle}_{(adj)}-\text{angle}_{(mov)}$. If in step 302, the CPU 36 determines that the answer point 55 originated at quadrant 4, then it proceeds to step 310 and determines whether $Y_{ans}>Y_1$. If $Y_{ans}>Y_1$, then the CPU 36 sets the angular $_{anwer}=\text{angle}_{(adj)}-\text{angle}_{(mov)}$ in step 312. However, if $Y_{ans}$ is not greater than $Y_1$, then the CPU 36 proceed to step 314 and sets the angular $_{answer}=\text{angle}_{(adj)}+\text{angle}_{(mov)}$.

Next, the CPU 36 the proceeds to step 316 and calculates the distance of travel along the X-axis and the Y-axis using the following equations:

$X_{dist}=M*\cos(\text{angle}_{(ans)}(\text{MULT1}))$, and $Y_{dist}=M*\sin(\text{angle}_{(ans)}(\text{MULT2}))$.

Then, using the preceding distances of travel, the CPU 36, in step 264, calculates the final value of the answer point 55 by adding the distances of travel, i.e., $X_{dist}$ and $Y_{dist}$ to the values of X and Y at the first data point, respectively.

Figure 9:
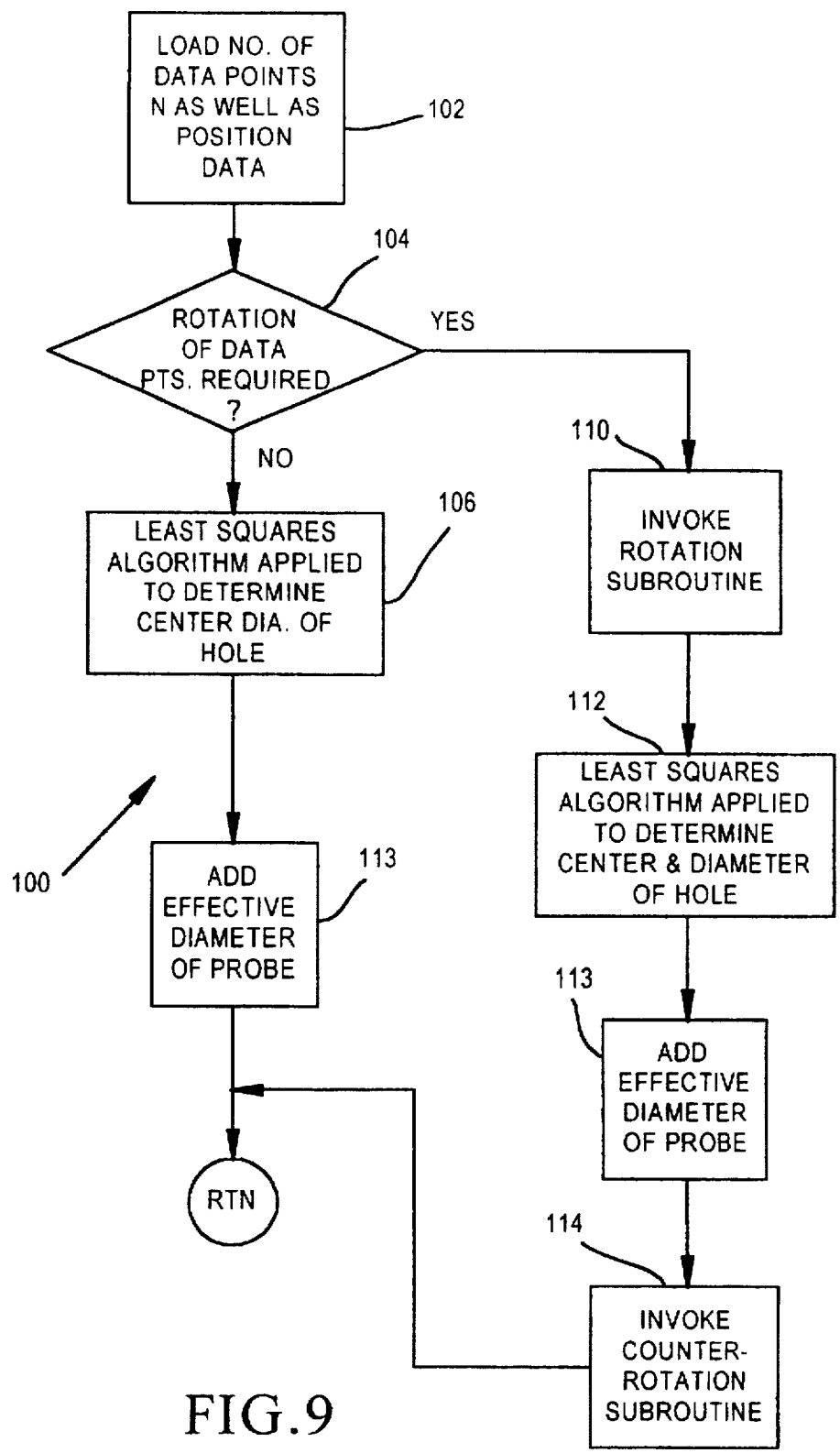
FIG. 9 is a flow chart showing a hole measurement subroutine invoked by the calculation routine.

Once the answer point has been counter-rotated to its proper position, as shown in FIG. 7b, then the CPU 36 returns to step 114 of the hole measurement subroutine 100, as shown in FIG. 9. Then, the CPU 36 returns to step 92 of the calculation routine 46, as shown in FIG. 8 and proceeds to step 93. In step 93, the CPU 36 formats and stores the calculated data within its memory and then returns to step 78 of the main routine 60, shown at FIG. 4. In a preferred embodiment, the system processor 21 then retakes control and proceeds to step 80 and displays the stored calculated data on monitor 37. The system processor 21 may also contain a routine which automatically loads the calculated data into a statistical control process routine 38, as is well known in the art, to look for trends in machining accuracy.

In a second embodiment, the probe system 20, shown in FIG. 3, can be used to measure more than a single feature, it can also be used to measure a variety of different types of features. For example, the system 20 can be used to measure a surface, a profile, and a cylinder, as well as the hole discussed above, using the main routine 60, shown in FIG. 4. To accomplish this, the post processor 28 is programmed to create a different type of probe head destination file for each feature. For example, if a surface is being measured, the probe head 34 will be directed downwardly onto the surface, preferably each of then data point measurements are measured along an equally divided surface length. For a profile or a cylinder, the probe 35 will be directed to a point below the height of the feature of the component 48 and then moved horizontally in until it makes contact with the feature, as shown in FIG. 12.

To perform calculations on a variety of features, the CPU 36 uses the calculation routine 320, shown in FIG. 13. The calculation routine 320 begins at step 322, where the CPU 36 loads all the data points stored in the logger routine 44. Next, in step 324, the CPU 36 determines how many separate features are represented by the data points nd sets the value equal to F. In step 326, the CPU 36 initializes a feature counter m to 1. Then, in step 328, the CPU 36 loads the data points representing the feature m currently being calculated.

The type of feature being processed is then checked by the CPU 36 in steps 330 342. First, in step 330, the CPU 36 checks to see if the feature is a hole, and if it is, it proceeds to step 332 and implements the hole measurement subroutine 100, shown if FIG. 9. If the feature is not a hole, then the CPU 36 proceeds to step 334, and determines whether the feature is a cylinder. If the feature is a cylinder, then the CPU 36 proceeds to step 336 and invokes a cylinder measurement subroutine (not shown). The cylinder measurement subroutine is identical to the hole measurement subroutine 100, except that in step 113, the effective diameter of the probe 35 is subtracted instead of added, since the measurement is taken from outside the feature instead of inside the feature.

If the CPU 36 determines that the feature is not a cylinder in step 334, then it proceeds to step 338 and checks to see if it is a profile. If the feature is a profile, then the CPU 36 proceeds to step 340 and invokes a profile measurement subroutine to calculate an edge, as is well known in the art. If the feature is not a profile, then the CPU 36 proceeds to step 342 and determines whether the feature is a surface, and if it is, then the CPU 36 proceeds to step 344 and invokes a surface measurement subroutine, as is also well known in the art.

Once the dimension of the feature has been calculated, the CPU 36 proceeds to step 346 to check for any more features to be processed. If all the features have been processed, then the calculation routine 320 returns to the main routine 60 and proceeds as in the first embodiment. However, if the CPU 36 determines that more features need to be processed, then the feature counter is incremented in step 348, and the CPU 36 reruns the routine from step 328. The calculation routine will continue to run until all the features have been processed.

The above features provide a probing system that allows an NC device to carry out tolerance measurements on a component it has just machined without the need to transfer the component to a device specializing in tolerance measurement such as a CMM. Further, the probing system is capable of measuring a feature that does not lie in the (x,y) plane by rotating it into the (x,y) plane. This allows the, use of a simplified calculation to determine the characteristics of the feature. The probing system then counter-rotates the feature back to its original position in space. This manipulation of measured variables allows an NC device to measure along 5 axes at relatively high speeds. Thus, the present invention provides an accurate and time saving measuring device.

Except as otherwise disclosed herein, the various components shown in outline or block form are individually well know and their internal construction and their operation is not critical either to the making or the using of this invention.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only the following claims.

What is claimed is:

1. A probing system for determining a measured set of dimensions of at least one feature of an object, said system comprising:

an input device that receives an ideal set of dimension of the at least one feature, said input device generating a first signal indicative of an amount of samples and a location of each of the samples of the at least one feature;

a probe device, electrically connected to said input device, said probe device receiving the first signal from said input device, and in response directing a probe to the location of each of the samples, said probe device outputting a second signal indicative of measured three-dimensional locations of the samples; and a processor electrically connected to said probe device, said processor receiving the second signal indicative of the measured three-dimensional locations of the samples, said processor operating upon said second signal to numerically rotate the three-dimensional measured locations about a single one of the samples until each of the samples is numerically represented as a point lying on a single two dimensional plane, said processor using the numerically rotated samples to calculate a set of rotated dimensions, said processor then operating on said rotated dimensions to numerically counter-rotate said rotated dimensions about the single one of the samples to determine the measured set of dimensions.

2. The probing system of claim 1, wherein said input device includes a computer aided design system that receives the ideal set of dimensions, and converts them to a series of high level instructions; and a post processor in communication with the computer aided design system that converts the series of high level instructions to said first signal indicative of the amount of samples and the location of the samples of the at least one feature.

3. The probing system of claim 1, wherein said probing device includes a numerically controlled device having a machine control unit that controls the directing of the probe to the location of each of the samples and outputs the second signal indicative of the measured locations of the samples.

4. The probing system of claim 3, wherein said numerically controlled device further including a plurality of encoders that report the measured locations to the machine control unit, when the probe contacts the object while moving to the location of each of the samples.

5. The probing system of claim 3, wherein said numerically controlled device is a computer numerically controlled device having a memory that stores the location of each of the samples made by said probing device.

6. The probing system of claim 3, wherein said numerically controlled device is operable in at least five axes.

7. The probing system of claim 6, wherein said numerically controlled device performs machining operations on said object.

8. The probing system of claim 7, wherein said numerically controlled device performs drilling on said object.

9. The probing system of claim 1 further including a display monitor in communication with said processor for displaying the set of dimensions of the at least one feature and comparing the measured set of dimensions with the ideal set of dimensions.

10. A method for determining a measured set of dimensions of at least one feature of an object, said method comprising the steps of:

inputting an ideal set of dimensions of the at least one feature;

generating an amount and location of samples taken of the at least one feature based on the ideal set of dimensions;

directing a probe to the location of the samples;

outputting measured location points, each representing a three-dimensional location, where the probe makes contact with the object;

calculating a numerical rotation of the measured location points, each of the points corresponding to one of the samples, about a designated one of the measured location points until each of the rotated location points is lying on a two dimensional plane;

calculating a rotated measured set of dimensions using the numerically rotated location points; and calculating a numerical counter-rotation of the rotated measured set of dimensions around the designated one of the location points to determine the measured set of the dimensions.

11. The method for determining a measured set of dimensions according to claim 10 wherein said step of calculating a numerical rotation of each of the measured locations includes the steps of:

calculating a numerical rotation of the measured location points around the designated one of the location points until the measured location points are parallel with one axis then designating the measured location points as partially rotated points; and calculating a numerical rotation of the partially rotated points around the designated one of the measured location points until the partially rotated points lie within one plane then designating the partially rotated points as the rotated location points.

12. The method for determining a measured set of dimensions according to claim 11, wherein the partially rotated points are parallel to the Y-axis.

13. The method for determining a measured set of dimensions according to claim 11, wherein the one plane is an X-Y plane.

14. The method for determining a measured set of dimensions according to claim 10, wherein said step of calculating a rotated measured set of dimensions includes a least squares algorithm.

15. The method for determining a measured set of dimensions according to claim 10, wherein said step of calculating a numerical counter-rotation of the rotated measured set of dimensions includes the steps of:

calculating a numerical counter-rotation of the rotated measured set of dimensions around the designated one of the measured location points until the measured set of dimensions are parallel with one axis, then designating the measured set of dimensions as the partially counter-rotated measured set of dimensions; and calculating a numerical counter-rotation of the partially counter-rotated measured set of dimensions around the designated one of the location points until the partially counter-rotated points lie in a plane of the location points, then designating the partially counter-rotated points as the measured set of the dimensions.

16. A method of simplifying a calculation of a series of three-dimensional data points sampled along 5 axes of a Numerically Controlled machine by repositioning the series of three-dimensional data points such that each of the data points is lying along a plane defined by an X and Y axes, allowing the calculation of a measured set of dimensions by the Numerically Controlled machine to be performed rapidly, said method comprising the steps of:

designating a first point of the data points sampled along the 5 axes of the Numerically Controlled machine as an origin for defining each remaining one of the data points in polar coordinates;

calculating a numerical rotation of each of the data points by some angle, except the first point, around the origin until all newly positioned points are parallel with the Y-axes of the Numerically Controlled machine; and calculating a numerical rotation of the rotated newly positioned data points around the origin until the series of data points is lying along the plane defined by the X and Y axes of the Numerically Controlled machine.

* * * * *